US010355810B1

(12) United States Patent
Muthuswamy

(10) Patent No.: US 10,355,810 B1
(45) Date of Patent: Jul. 16, 2019

(54) METHOD, DEVICE, AND SYSTEM FOR CALIBRATING AND ADAPTING TRANSMISSION RATE IN WIRELESS COMMUNICATION

(71) Applicant: Wipro Limited, Bangalore (IN)

(72) Inventor: Sridharan Muthuswamy, San Jose, CA (US)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/899,047

(22) Filed: Feb. 19, 2018

(51) Int. Cl.
*H04L 1/16* (2006.01)
*H04L 1/00* (2006.01)
*H04L 27/20* (2006.01)
*H04L 27/26* (2006.01)

(52) U.S. Cl.
CPC .......... *H04L 1/0003* (2013.01); *H04L 1/0009* (2013.01); *H04L 1/0016* (2013.01); *H04L 1/0021* (2013.01); *H04L 27/20* (2013.01); *H04L 27/2647* (2013.01)

(58) Field of Classification Search
CPC ........................ H04L 1/0003; H04L 27/2647; H04L 1/0021; H04L 1/0016; H04L 27/20; H04L 1/0009
See application file for complete search history.

(56) References Cited

U.S. PATENT DOCUMENTS

| | | | |
|---|---|---|---|
| 6,823,005 B1 | 11/2004 | Chuang et al. | |
| 7,289,574 B2 | 10/2007 | Parolari | |
| 2012/0146047 A1* | 6/2012 | Kneissl | H01L 33/387 257/76 |
| 2014/0169195 A1* | 6/2014 | Hsin | H04W 24/06 370/252 |
| 2015/0271787 A1* | 9/2015 | Wong | H04B 7/0608 370/329 |
| 2016/0057647 A1* | 2/2016 | Sullivan | H04L 1/1607 370/253 |
| 2018/0123732 A1* | 5/2018 | Axmon | H04L 1/0005 |

* cited by examiner

*Primary Examiner* — Dac V Ha
(74) *Attorney, Agent, or Firm* — Pepper Hamilton LLP

(57) ABSTRACT

A method, device, and system for calibrating and adapting transmission rate in wireless communication is disclosed. The method includes sending, based on a static Module and Coding Schemes (MCS) probe table, a plurality of probe packets at each of a set of probe MCSs associated with a current MCS. The static MCS probe table includes a plurality of MCSs and a set of probe MCSs associated with each of the plurality of MCSs. The method further includes determining percentage of probe packets successfully received by a receiver for each of the set of probe MCSs associated with the current MCS, based on a link adaptation statistic packet received from the receiver. The method includes identifying an MCS from the set of probe MCSs for subsequent transmissions based on the determined percentage.

18 Claims, 10 Drawing Sheets

METHOD, DEVICE, AND SYSTEM FOR CALIBRATING AND ADAPTING TRANSMISSION RATE IN WIRELESS COMMUNICATION

FIELD

This disclosure relates generally to wireless networks and more particularly to method, device, and system for calibrating and adapting transmission rate in wireless communication.

BACKGROUND

In a long-range land-to-sea (LRLS) communication that uses Variable-Time-Slot-TDMA (VTS-TDMA) and Automatic Repeat Request (ARQ) error-control mechanism in the 5 GHz unlicensed spectrum and includes a Base Transceiver Station (BTS) on land and a Customer Premises Equipment (CPE) out in the sea (for example, on ships) link adaptation procedure is utilized. This procedure enables communication end-points to choose the best Modulation and Coding Scheme (MCS) for a given Radio Frequency (RF) channel condition in order to maximize the throughput. However, using an MCS from a non-optimal link adaptation either over-estimates the throughput leading to an unsuccessful transmission of the data frame or under-estimates the throughput causing an underutilization of the broadband LRLS network. As a result, the rate versus range performance suffers from a non-optimal link adaptation.

Service quality (SLA) maintenance issue for CPEs in LRLS exists when the throughput drops below 3 MBPS, which may happen at smaller distances (reduced cell edge) due to a non-optimal link adaptation. In such a scenario, there is a need to switch data-path to Very Small Aperture Terminal (VSAT) network to maintain SLA. However, network entry/re-entry events may trigger data-path switch back to LRLS network (from VSAT). This switching back and forth of data-paths, between LRLS and VSAT channels may get into unnecessary "flapping" (or ping-pong) effect. Such switching back and forth affects the overall Quality of Experience (QoE). Since the LRLS operates in a shared spectrum, the channel quality becomes unpredictable based on the usage of the shared spectrum by other entities. Further, non-optimal link adaptation may further aggravate the flapping issue post switching of channel from VSAT to LRLS under unfavorable conditions of the LRLS channel.

One of the conventional methods discloses link adaptation procedure with MCS selection and switching using Signal-to-Interference Ratio (SIR) metric. However, in this conventional method, infinite retransmission ARQ in link adaptation model with SIR thresholds is assumed, which are hard to compute in the LRLS system. Another conventional method discloses link adaptation procedure with MCS selection and switching using Block Level Error Ratio (BLER) thresholds. However, in this conventional method, BLER thresholds in link adaptation do not capture ARQ retransmissions of data frames.

SUMMARY

In one embodiment, a method of adapting transmission rate between a Customer Premises Equipment (CPE) and a Base Transceiver Station (BTS) is disclosed. The method includes sending, based on a static Module and Coding Schemes (MCS) probe table, a plurality of probe packets at each of a set of probe MCSs associated with a current MCS. The static MCS probe table comprises a plurality of MCSs and a set of probe MCSs associated with each of the plurality of MCSs. The method further includes determining percentage of probe packets successfully received by a receiver for each of the set of probe MCSs associated with the current MCS, based on a link adaptation statistic packet received from the receiver. The method includes identifying an MCS from the set of probe MCSs for subsequent transmissions based on the determined percentage.

In another embodiment, a method of adapting transmission rate between a CPE and a BTS is disclosed. The method includes exchanging a plurality of packets at a current MCS during a communication session between the CPE and the BTS. The method further includes determining Automatic Repeat Request (ARQ) retransmit percentage for the communication session. The method includes comparing the ARQ retransmit percentage with an ARQ retransmit percentage threshold associated with the current MCS. The method further includes identifying, based on an ARQ MCS table, an MCS for subsequent transmissions, when the ARQ retransmit percentage reaches or exceeds the ARQ retransmit percentage threshold. For each of a plurality of MCSs, the ARQ MCS table comprises an associated ARQ retransmit percentage threshold and an associated subsequent MCS.

In yet another embodiment, a method of calibrating transmission rate between a CPE and a BTS is disclosed. The method includes initiating a communication session between the CPE and the BTS through a client computing device communicatively coupled to the CPE and a server computing device communicatively coupled to the BTS. The communication session is routed through an attenuator. The method further includes determining a throughput, during the communication session, associated with each of a plurality of MCSs. The method includes computing average ARQ retransmit percentage for each of the plurality of MCSs for an associated average throughput. The method further includes creating a static MCS probe table comprising each of the plurality of MCSs, a set of probe MCSs associated with each of the plurality of MCSs, and throughput associated with each probe MCS in each set of probe MCSs, wherein a current MCS is modified to an MCS selected from an associated set of probe MCSs based on the static MCS probe table. The method includes creating an ARQ MCS table based on the plurality of MCSs and an associated average ARQ retransmit percentage, wherein for each of the plurality of MCSs the ARQ MCS table comprises an associated ARQ retransmit percentage threshold and an associated future MCS, and wherein a current MCS is changed to the associated future MCS when ARQ retransmit percentage threshold linked with the current MCS is reached or exceeded.

In an embodiment, a transceiver for adapting transmission rate between a CPE and a BTS is disclosed. The transceiver includes an antenna array, a processor communicatively coupled to the antenna array, and a memory communicatively coupled to the processor, wherein the memory stores processor instructions, which on execution causes the processor to send, based on a static MCS probe table, a plurality of probe packets at each of a set of probe MCSs associated with a current MCS, wherein the static MCS probe table comprises a plurality of MCSs and a set of probe MCSs associated with each of the plurality of MCSs; determine percentage of probe packets successfully received by a receiver for each of the set of probe MCSs associated with the current MCS, based on a link adaptation statistic packet received from the receiver; and identify an MCS from the set of probe MCSs for subsequent transmissions based on the determined percentage.

In another embodiment, a transceiver for adapting transmission rate between a CPE and a BTS is disclosed. The transceiver includes an antenna array, a processor communicatively coupled to the antenna array, and a memory communicatively coupled to the processor, wherein the memory stores processor instructions, which on execution causes the processor to exchange a plurality packets at a current MCS during a communication session between the CPE and the BTS; determine ARQ retransmit percentage for the communication session; compare the ARQ retransmit percentage with a ARQ retransmit percentage threshold associated with the current MCS; and identify, based on an ARQ MCS table, an MCS for subsequent transmissions, when the ARQ retransmit percentage reaches or exceeds the ARQ retransmit percentage threshold, wherein for each of a plurality of MCSs, the ARQ MCS table comprises an associated ARQ retransmit percentage threshold and an associated subsequent MCS.

In yet another embodiment, a system for calibrating transmission rate between a CPE and a BTS is disclosed. The system includes a processor and a memory communicatively coupled to the processor, wherein the memory stores processor instructions, which on execution causes the processor to: initiate a communication session between the CPE and the BTS through a client computing device communicatively coupled to the CPE and a server computing device communicatively coupled to the BTS, wherein the communication session is routed through an attenuator; determine a throughput, during the communication session, associated with each of a plurality of MCSs; compute average ARQ retransmit percentage for each of the plurality of MCSs for an associated average throughput; create a static MCS probe table comprising each of the plurality of MCSs, a set of probe MCSs associated with each of the plurality of MCSs, and throughput associated with each probe MCS in each set of probe MCSs, wherein a current MCS is modified to an MCS selected from an associated set of probe MCSs based on the static MCS probe table; and create an ARQ MCS table based on the plurality of MCSs and an associated average ARQ retransmit percentage, wherein for each of the plurality of MCSs the ARQ MCS table comprises an associated ARQ retransmit percentage threshold and an associated future MCS, and wherein a current MCS is changed to the associated future MCS when ARQ retransmit percentage threshold linked with the current MCS is reached or exceeded.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
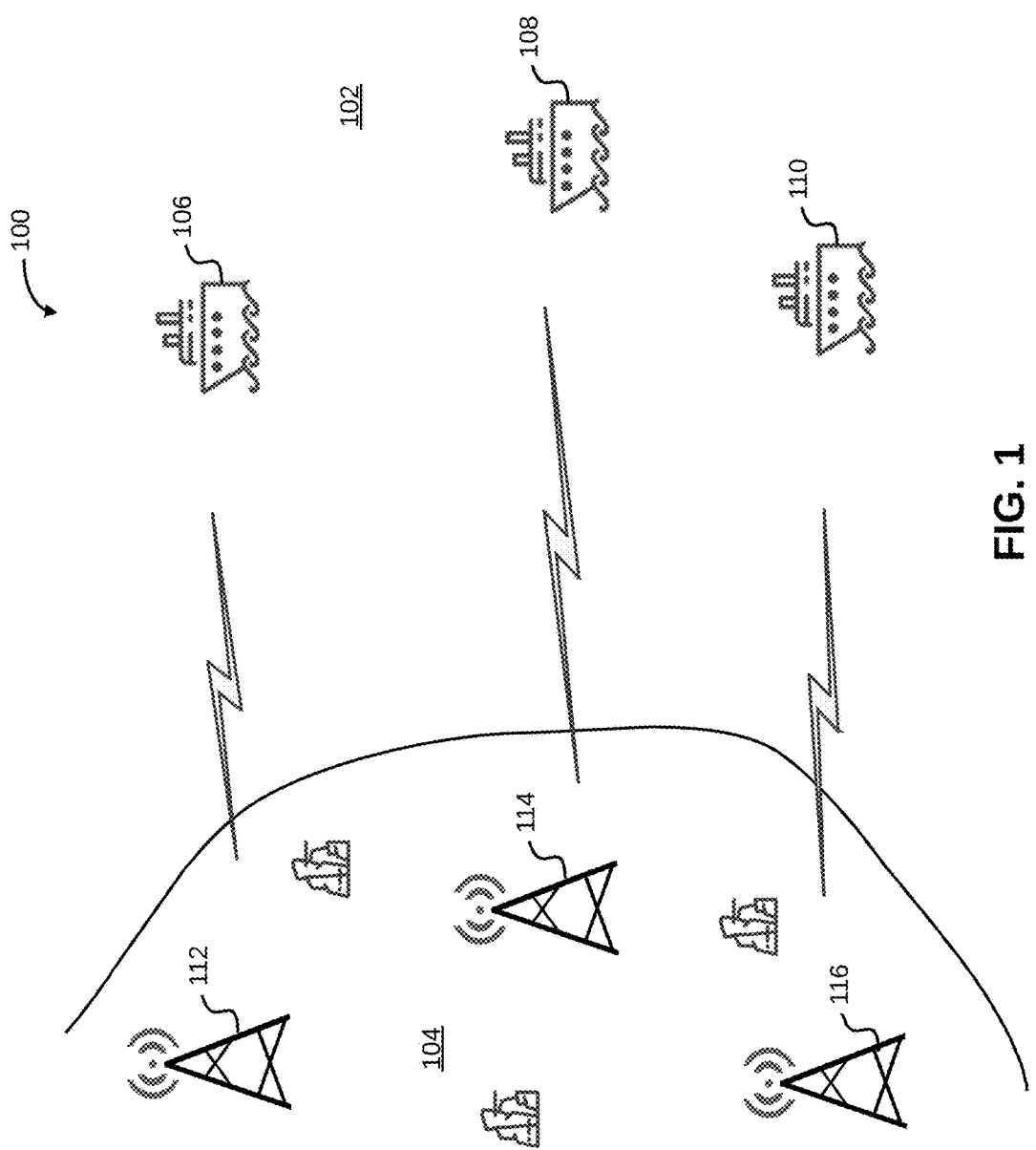
FIG. 1 is a block diagram illustrating an environment in which various embodiments may be employed.

Additional illustrative embodiments are listed below. In one embodiment, an environment 100 (that is exemplary) in which various embodiments may be employed is illustrated in FIG. 1. Environment 100 includes a water body 102 and a land 104. Water body 102, for example, may be a sea or an ocean and land 104, for example, may include coastal areas or islands. A plurality of watercrafts, for example, a ship 106, a ship 108, and a ship 110, while navigating in water body 102, may be in communication with one or more Base Transceiver Stations (BTSs), for example, a BTS 112, a BTS 114, and a BTS 116 on land 104. It will be apparent to a person skilled in the art that a watercraft, for example, may include, but is not limited to a boat, a submarine, a hovercraft, and a seaplane.

Each of the plurality of watercrafts may include a Customer Premises Equipment (CPE) or a mobile station that establishes communication with one or more BTSs. In other words, in order to provide communication service within a watercraft, the CPE installed on the watercraft establishes communication with a BTS. By way of an example, a CPE in ship 106 establishes communication with BTS 112, a CPE in ship 108 establishes communication with BTS 114, and a CPE in ship 110 establishes communication with BTS 116. The communication may be established using a long range land-to-sea wireless communication link using Variable-Time-Slot-TDMA (VTS-TDMA) in the 5 GHz unlicensed shared spectrum.

Figure 2A:
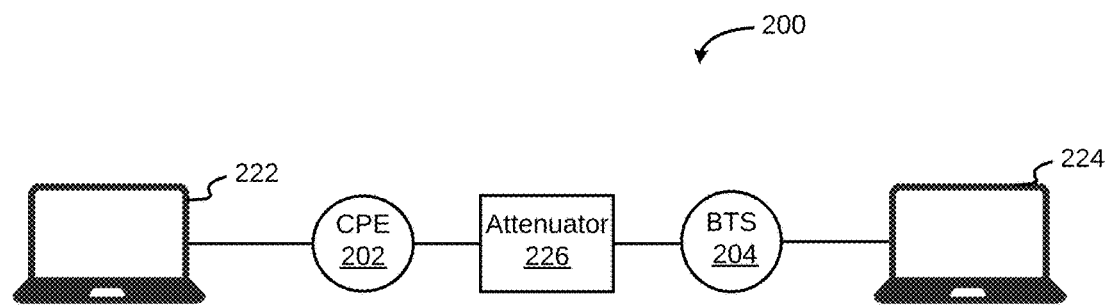
FIGS. 2A and 2B illustrate a block diagram of a system for calibrating transmission rate between a CPE and a BTS, and a transceiver for adapting transmission rate between the CPE and the BTS, in accordance with an embodiment.
Figure 2B:
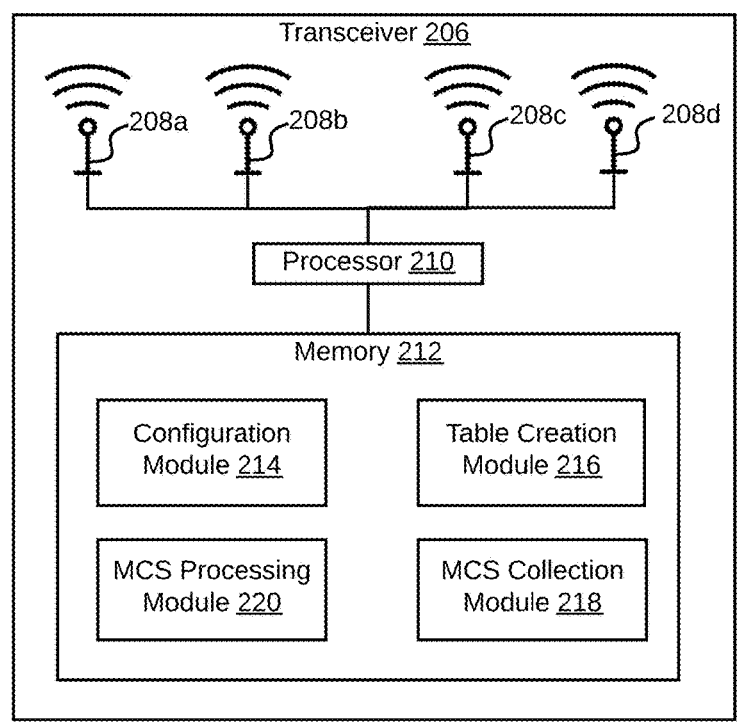

Referring now to FIGS. 2A and 2B, a block diagram of a system 200 for calibrating transmission rate between a CPE 202 and a BTS 204 and a transceiver 206 for adapting transmission rate between CPE 202 and BTS 204 is illustrated, in accordance with an embodiment. System 200 may be implemented in a land-to-sea wireless network by using a long range land-to-sea wireless communication link. It will be apparent to a person skilled in the art that system 200 is not limited to the land-to-sea wireless network. System 200 includes CPE 202 and BTS 204, such that, BTS 204 may be the serving BTS for CPE 202. In order to calibrate the transmission rate, system 200 includes a client computing device 222 that is communicatively coupled to CPE 202 and a server computing device 224 that is communicatively coupled to BTS 204. Client computing device 222 and server computing device 224 may be plugged into high speed Ethernet ports of CPE 202 and BTS 204 respectively and may be in the same L2 network.

A communication session may be initiated between CPE 202 and BTS 204 through client computing device 222 and server computing device 224. The communication session may be an IPERF (or IxChariot) session that is initiated for downlink Transmission Control Protocol (TCP) throughput tests. In an embodiment, link adaptation may be disabled (through a configuration knob) on both CPE 202 and BTS 204, while the communication session is initiated. The communication session may be routed through an attenuator 226, which may be a JFW variable software controlled attenuator. Attenuator 226 may be used to vary the attenuation levels while the communication session is ongoing. The method of calibration is further explained in detail in conjunction with FIG. 3.

Each of CPE 202 and BTS 204 may include a transceiver 206 that enables communication between CPE 202 and BTS 204. Transceiver 206 includes an antenna array that may be used to establish communication with one or more of CPE 202 and BTS 204. The antenna array may include an antenna 208*a*, an antenna 208*b*, an antenna 208*c*, and an antenna 208*d*. It will be apparent to a person skilled in the art that the number of antennas in the antenna array is not limited to four. Transceiver 206 further includes a processor 210 that is communicatively coupled to antennas 208*a* to 208*d*. Processor 210 enables transceiver 206 to perform link adaptation by adapting transmission rate on the communication link between CPE 202 and BTS 204.

Processor 210 is further communicatively coupled to a memory 212, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM). Memory 212 may store processor instructions, which on execution may cause processor 210 to perform various steps than enable link adaptation by adapting transmission rate. To this end, memory 212 includes a configuration module 214, a table generation module 216, a Module and Coding Scheme (MCS) collection module 218, and an MCS processing module 220. Configuration module 214 is a functional unit that reads a plurality of configuration parameters stores in a non-volatile memory and loads it into the main memory (i.e., RAM). During power up BTS 204 and CPE 202, configuration module 214 may read the plurality of configuration parameters from the non-volatile memory and initialize the main memory. The plurality of configuration parameters may include, but are not limited to length of a probe packet (la_probe_pkt_len), number of probe packets to be transmitted at one time (la_num_probes), percentage of airframes that include probe packets (la_probe_fraction), period at which a receiver collects probe statistics (la_probe_stats_intvl), and threshold above which probe statistics are considered valid (la_confidence_level). This is further explained in detail in conjunction with FIG. 4.

Figure 3:
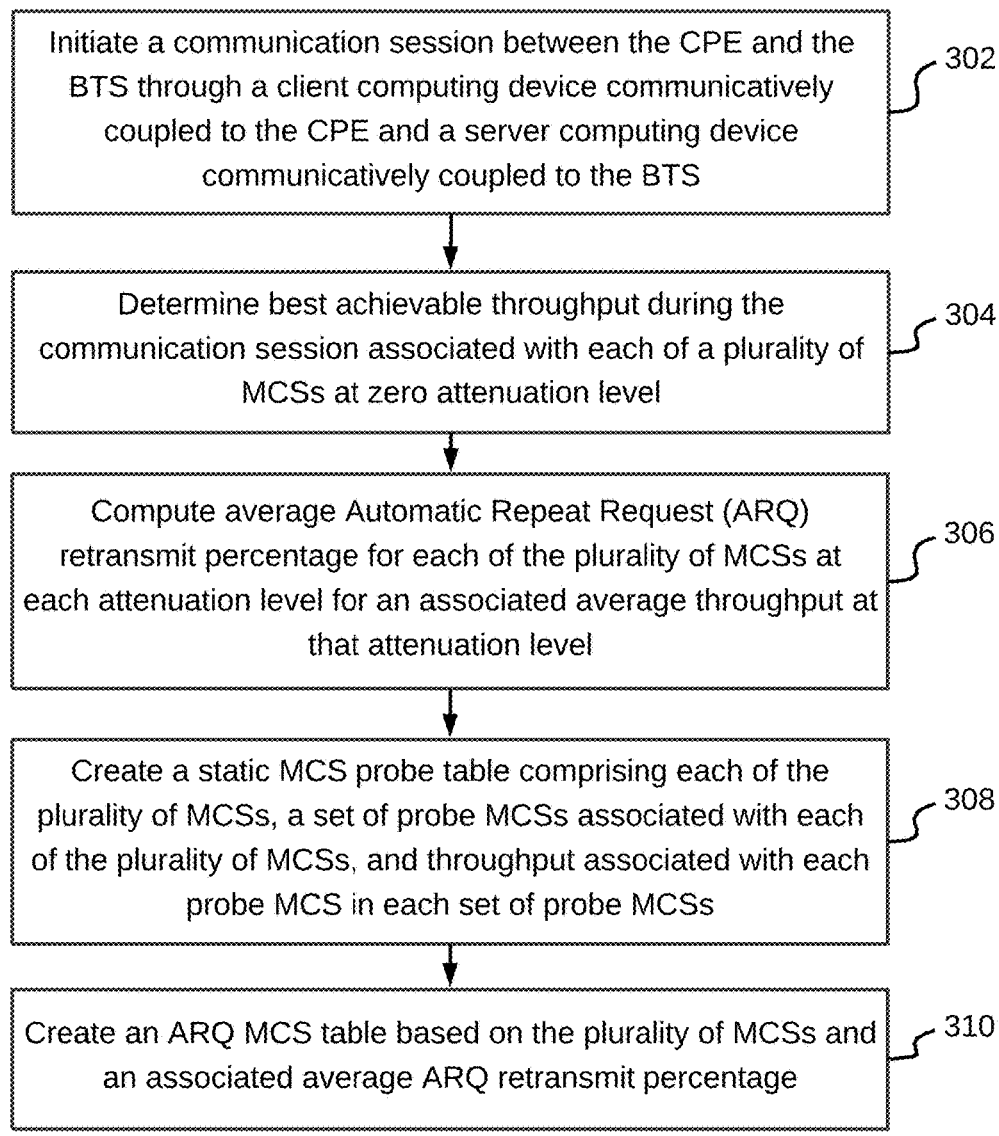
FIG. 3 illustrates a flowchart of a method of calibrating transmission rate between a CPE and a BTS, in accordance with an embodiment.

Table generation module 216 generates a plurality of static tables in a test bed environment, which is explained in detail in conjunction with FIG. 3. The plurality of static tables are disclosed in detail in FIG. 3 as tables 1 to 6. A plurality of probe packets may be sent, via the antenna array, to a receiver at each of a set of probe MCSs associated with a current MCS, based on a static MCS probe table disclosed in FIG. 3. Thereafter, a receiver sends back a link adaption statistic packet, which is analyzed by MCS collection module 218. The link adaptation statistic packet may include information related to the number of probe packets that were successfully received by the receiver for each of the set of probe MCSs. Based on this information, MCS collection module 218 determines a percentage of probe packets successfully received by the receiver for each of the set of probe MCSs associated with the current MCS. Additionally, MCS collection module 218 determines Automatic Repeat Request (ARQ) retransmit percentage for the ongoing communication session on the current MCS. This is explained in detail in conjunction with FIG. 4.

Based on the percentage of probe packets successfully received for each of the set of probe MCSs and based on one or more of the plurality of static tables, MCS processing module 220 identifies an MCS that is to be used for subsequent transmissions. In an embodiment, MCS processing module 220 may ramp-up from the current MCS. This is explained in detail in conjunction with FIG. 3 to FIG. 7. In another embodiment, MCS processing module 220 may ramp-down or slap-down from the current MCS. This is explained in detail in conjunction with FIG. 8. It will be apparent to a person skilled in the art that both embodiments discussed above (i.e., ramp-up and ramp-down) may be executed simultaneously.

System 200 ensures that Quality of Service (QoS) (by way of throughput) is maximized for an end-user, while minimizing the use of satellite network and maximizing the use of long range land-to-sea wireless network including 4G and 5G but not limited to broadband, WiMAX, and Wi-Fi.

Referring now to FIG. 3, a flowchart of a method of calibrating transmission rate between a CPE and a BTS is illustrated, in accordance with an embodiment. This method may be implemented in a land-to-sea wireless network by using a long range land-to-sea wireless communication link. It will be apparent to a person skilled in the art that the method is not limited to the land-to-sea wireless network. In order to calibrate the transmission rate, a client computing device is communicatively coupled to the CPE and a server computing device is communicatively coupled to the BTS. The client computing device and the server computing device may be plugged into high speed Ethernet ports of the CPE and BTS respectively and may be in the same L2 network.

At step 302, a communication session is initiated between the CPE and the BTS through the client computing device and the server computing device. The communication session may be an IPERF (or IxChariot) session that is initiated for downlink Transmission Control Protocol (TCP) throughput tests. In an embodiment, link adaptation may be disabled (through a configuration knob) on both the CPE and BTS, while the communication session is initiated. The communication session may be routed through an attenuator. The attenuator may be a JFW variable software controlled attenuator.

During the communication session, at step 304, a throughput associated with each of a plurality of Module and Coding Schemes (MCSs) may be determined. In an embodiment, the best achievable throughput is determined at a zero attenuation level for each of the plurality of MCSs, during the communication session. This is discussed in detail below. In an exemplary embodiment, in order to determine the throughput, MCS may be set to 0 on the CPE (i.e., for the uplink) and on the BTS (i.e., for the downlink), MCS is set to X. The value of X may be represented by equation 1, for a dual frequency BTS configuration (i.e., four spatial streams) and equation 2, for a single frequency BTS configuration (i.e., two spatial streams):

$$X \in [0,30] \quad (1)$$

$$X \in [0,15] \quad (2)$$

In an exemplary embodiment, information regarding the MCSs, indexed by the corresponding number of Spatial Streams (SSs), is depicted in table 1 given below:

TABLE 1

| SS1 | 0  | 1  | 2  | 3  | 4  | 5  | 6  | 7  |
|-----|----|----|----|----|----|----|----|----|
| SS2 | 8  | 9  | 10 | 11 | 12 | 13 | 14 | 15 |
| SS3 | 16 | 17 | 18 | 19 | 20 | 21 | 22 | 23 |
| SS4 | 24 | 25 | 26 | 27 | 28 | 29 | 30 | 31 |

In the table 1 above, the MCSs from 0 to 7 are associated with SS1, the MCSs from 8 to 15 are associated with SS2, the MCSs from 16 to 23 are associated with SS3, and the MCSs from 24 to 31 are associated with the SS4. For a given BTS configuration and an MCS, the attenuator may be varied from 'Y=0 dB' to 'Y=60 dB' (or until the cell edge is detected) in increments of 1 dB. For each setting of Y, downlink TCP throughput test may be run for about three minutes. Multiple such TCP throughput tests (for example, five in number) are run. These TCP throughput tests are then used to compute the average TCP throughput at a given MCS. Best TCP throughput values in Mbps (at zero attenuation level, i.e., at Y=0 dB) for various MCSs is depicted by table 2 given below:

TABLE 2

| SS1 | 4.4  | 8.5  | 12.1 | 16.0 | 24.0 | 29.9 | 33.3 | 35.9 |
|-----|------|------|------|------|------|------|------|------|
| SS2 | 8.4  | 16.1 | 23.3 | 30.8 | 43.5 | 55.3 | 59.1 | 62.2 |
| SS3 | 12.4 | 24.3 | 35.3 | 44.8 | 61.5 | 71.2 | 74.2 | 76.5 |
| SS4 | 16.2 | 31.4 | 44.7 | 57.8 | 71.0 | 78.9 | 80.6 | 80.6 |

At step 306, an average Automatic Repeat Request (ARQ) retransmit percentage is computed for each of the plurality of MCSs at each attenuation level for an associated average throughput. In an embodiment, there is a facility to read the average ARQ retransmit percentage from a main memory (of the CPE or the BTS) during each test and the mean of the average ARQ retransmit percentage is recorded against the computed average TCP throughput values. The attenuation level may start at 0 dB and may be increased by 1 dB till the attenuation level reaches 60 dB, for example. For a given MCS, at each increment of 1 dB, an average ARQ retransmit percentage is computed for the average throughout at that attenuation level. This is repeated for each of the plurality of MCS. In other words, for each MCS, at each attenuation level, ARQ retransmit percentage and throughput are measured. This is further explained in detail at step 310.

At step 308, a static MCS probe table, which includes the plurality of MCSs and a set of probe MCSs associated with each of the plurality of MCSs, is created. In other words, a given MCS is mapped to a set of probe MCSs in the static MCS probe table. The static MCS probe table additionally includes throughput associated with each probe MCS in each set of probe MCSs. The static MCS probe table is used to adapt transmission rate between the CPE and the BTS in an actual or live scenario, when they are communicating directly with each other. The transmission rate may be adapted by modifying a current MCS to an MCS selected from an associated set of probe MCSs mapped to the current MCS in the static MCS probe table.

In order to determine best MCS for a communication session, a plurality of probe packets are sent at each of a set of probe MCSs associated with a current MCS to the receiver. The set of probe MCSs is selected from the plurality of MCSs based on predefined selection criteria. The predefined selections criteria may be that the set of probe MCSs includes MCSs that have similar throughput on different streams, in addition to a lower and higher MCS on the same stream. This is further explained in detail in conjunction with FIG. 3. In an embodiment, probe packets may be sent on five different probe MCSs for the current MCS. In continuation of the exemplary embodiment, a static MCS probe table for single frequency configuration of the BTS is depicted in table 3 and a static MCS probe table for a dual frequency configuration of the BTS is depicted in table 4. Table 3 and table 4 are derived from table 2.

TABLE 3

| Current MCS | Probe MCSs      | Probe Throughput (Mbps)     |
|-------------|-----------------|-----------------------------|
| 0           | 0, 1, 8, 2, 3   | 4.4, 8.5, 8.4, 12.1, 16.0   |
| 1           | 0, 1, 8, 2, 3   | 4.4, 8.5, 8.4, 12.1, 16.0   |
| 2           | 1, 2, 3, 9, 10  | 8.5, 12.1, 16.0, 16.1, 23.3 |
| 3           | 2, 3, 4, 10, 11 | 12.1, 16.0, 24.0, 23.3, 30.8|
| 4           | 3, 4, 5, 11, 6  | 16.0, 24.0, 29.9, 30.8, 33.3|
| 5           | 4, 5, 11, 6, 7  | 24.0, 29.9, 30.8, 33.3, 35.9|
| 6           | 5, 6, 7, 12, 13 | 29.9, 33.3, 35.9, 43.5, 55.3|
| 7           | 6, 7, 12, 13, 14| 33.3, 35.9, 43.5, 55.3, 59.1|
| 8           | 0, 8, 1, 2, 9   | 4.4, 8.4, 8.5, 12.1, 16.1   |
| 9           | 8, 2, 9, 3, 10  | 8.4, 12.1, 16.1, 16.0, 23.3 |
| 10          | 3, 9, 10, 4, 11 | 16.0, 16.1, 23.3, 24.0, 30.8|
| 11          | 10, 4, 5, 11, 12| 23.3, 24.0, 29.9, 30.8, 43.5|
| 12          | 11, 6, 7, 12, 13| 30.8, 33.3, 35.9, 43.5, 55.3|
| 13          | 6, 7, 12, 13, 14| 33.3, 35.9, 43.5, 55.3, 59.1|
| 14          | 7, 12, 13, 14, 15| 35.9, 43.5, 55.3, 59.1, 62.2|
| 15          | 7, 12, 13, 14, 15| 35.9, 43.5, 55.3, 59.1, 62.2|

TABLE 4

| Current MCS | Probe MCSs        | Probe Throughput (Mbps)      |
|-------------|-------------------|------------------------------|
| 0           | 0, 1, 8, 16, 24   | 4.4, 8.5, 8.4, 12.4, 16.2    |
| 1           | 0, 1, 2, 8, 9     | 4.4, 8.5, 12.1, 8.4, 16.1    |
| 2           | 1, 2, 3, 9, 10    | 8.5, 12.1, 16.0, 16.1, 23.3  |
| 3           | 2, 3, 4, 10, 11   | 12.1, 16.0, 24.0, 23.3, 30.8 |
| 4           | 3, 4, 5, 11, 6    | 16.0, 24.0, 29.9, 30.8, 33.3 |
| 5           | 4, 5, 11, 6, 7    | 24.0, 29.9, 30.8, 33.3, 35.9 |
| 6           | 5, 6, 7, 12, 13   | 29.9, 33.3, 35.9, 43.5, 55.3 |
| 7           | 6, 7, 12, 13, 14  | 33.3, 35.9, 43.5, 55.3, 59.1 |
| 8           | 1, 8, 2, 16, 9    | 8.5, 8.4, 12.1, 12.4, 16.1   |
| 9           | 3, 9, 24, 10, 17  | 16.0, 16.1, 16.2, 23.3, 24.3 |
| 10          | 10, 4, 11, 25, 18 | 23.3, 24.0, 30.8, 31.4, 35.3 |
| 11          | 5, 11, 25, 18, 12 | 29.9, 30.8, 31.4, 35.3, 43.5 |
| 12          | 7, 12, 19, 26, 13 | 35.9, 43.5, 44.8, 44.7, 55.3 |
| 13          | 12, 13, 27, 14, 20| 43.5, 55.3, 57.8, 59.1, 61.5 |
| 14          | 13, 14, 20, 15, 21| 55.3, 59.1, 61.5, 62.2, 71.2 |
| 15          | 14, 15, 20, 28, 21| 59.1, 62.2, 61.5, 71.0, 71.2 |
| 16          | 8, 16, 24, 17, 25 | 8.4, 12.4, 16.2, 24.3, 31.4  |
| 17          | 10, 17, 25, 18, 19| 23.3, 24.3, 31.4, 35.3, 44.8 |

TABLE 4-continued

| Current MCS | Probe MCSs | Probe Throughput (Mbps) |
|---|---|---|
| 18 | 11, 18, 19, 26, 27 | 30.8, 35.3, 44.8, 44.7, 57.8 |
| 19 | 12, 19, 26, 27, 20 | 43.5, 44.8, 44.7, 57.8, 61.5 |
| 20 | 14, 20, 28, 21, 22 | 59.1, 61.5, 71.0, 71.2, 74.2 |
| 21 | 15, 28, 21, 22, 23 | 62.2, 71.0, 71.2, 74.2, 76.5 |
| 22 | 21, 22, 23, 29, 30 | 71.2, 74.2, 76.5, 78.9, 80.6 |
| 23 | 21, 22, 23, 29, 30 | 71.2, 74.2, 76.5, 78.9, 80.6 |
| 24 | 16, 24, 17, 25, 18 | 12.4, 16.2, 24.3, 31.4, 35.3 |
| 25 | 17, 25, 18, 26, 19 | 24.3, 31.4, 35.3, 44.7, 44.8 |
| 26 | 18, 26, 27, 20, 28 | 35.3, 44.7, 57.8, 61.5, 71.0 |
| 27 | 19, 27, 20, 28, 22 | 44.8, 57.8, 61.5, 71.0, 74.2 |
| 28 | 20, 28, 22, 23, 29 | 61.5, 71.0, 74.2, 76.5, 78.9 |
| 29 | 21, 22, 23, 29, 30 | 71.2, 74.2, 76.5, 78.9, 80.6 |
| 30 | 21, 22, 23, 29, 30 | 71.2, 74.2, 76.5, 78.9, 80.6 |
| 31 | 31, 30, 20 | 80.6, 80.6, 61.5 |

At step 310, an ARQ MCS table is created based on the plurality of MCSs and an associated average ARQ retransmit percentage determined at step 306. For each of the plurality of MCSs, the ARQ MCS table includes an associated ARQ retransmit percentage threshold and an associated future MCS. A current MCS is changed to the associated future MCS, when ARQ retransmit percentage threshold linked with the current MCS is reached or exceeded. In other words, beyond a certain ARQ percentage, it is better to switch to an MCS that can provide similar or higher throughput under the given channel condition. In order to determine ARQ retransmit percentage threshold for an MCS, the throughput for the MCS is determined at different attenuation levels, starting from 0 dB and moving to 60 dB, for example, at increments of 1 dB at each step. At a certain attenuation level, the throughput for the MCS falls sharply, at this point another MCS may provide the same or higher throughput at that attenuation level. This is illustrated by way of an example in the graph depicted in FIG. 10.

Figure 10:
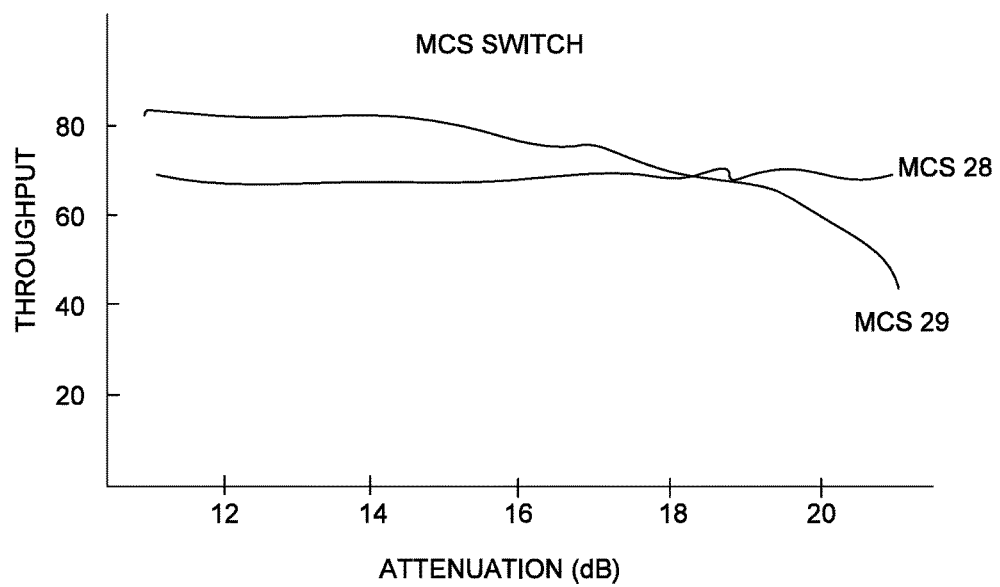
FIG. 10 is a graph of an example that illustrates throughput versus attenuation for different MCS levels.

In the graph as shown in FIG. 10, throughput for the MCS 29 (which may be at 64 QAM) is determined at different attenuation levels. At 17 dB attenuation level, the throughput for the MCS 29 drops sharply and the MCS 28 (which may be 16 QAM) has same throughput at 17 dB attenuation level, which remains more or less the same for few subsequent attenuation levels. Thus the attenuation level of 17 dB is the switching point at which the ARQ retransmit percentage is recorded. This would be the ARQ retransmit percentage threshold for MCS 29, and MCS 28 would be the MCS to be switched to when this threshold is reached or exceeded. In a similar manner, ARQ retransmit percentage threshold is computed for different MCSs. It will be apparent to a person skilled in the art that ARQ retransmit percentage threshold for each MCS may be determined at different attenuation levels.

In continuation of the exemplary embodiment above, an ARQ MCS table for a single frequency BTS configuration is depicted by a table 5 given below and an ARQ MCS table for a dual frequency BTS configuration is depicted in table 6 given below. The ARQ MCS table may also be termed as a link adaptation slap down table.

TABLE 5

| Current MCS | ARQ Retransmit % Threshold | Future MCS |
|---|---|---|
| 0 | 0 | 0 |
| 1 | 15.7 | 8 |
| 2 | 13.23 | 1 |
| 3 | 11.67 | 2 |
| 4 | 18.09 | 3 |
| 5 | 10.45 | 4 |
| 6 | 7.68 | 5 |
| 7 | 4.33 | 6 |
| 8 | 0 | 0 |
| 9 | 17.55 | 8 |
| 10 | 5.61 | 9 |
| 11 | 11.17 | 10 |
| 12 | 5.64 | 11 |
| 13 | 6.19 | 12 |
| 14 | 3.10 | 13 |
| 15 | 0 | 14 |

TABLE 6

| Current MCS | ARQ Retransmit % Threshold | Future MCS |
|---|---|---|
| 0 | 0 | 0 |
| 1 | 10.18 | 8 |
| 2 | 14.43 | 8 |
| 3 | 7.00 | 2 |
| 4 | 7.12 | 3 |
| 5 | 8.93 | 4 |
| 6 | 6.30 | 5 |
| 7 | 4.06 | 6 |
| 8 | 0 | 0 |
| 9 | 15.39 | 8 |
| 10 | 9.03 | 9 |
| 11 | 7.90 | 10 |
| 12 | 4.01 | 11 |
| 13 | 6.94 | 12 |
| 14 | 2.32 | 13 |
| 15 | 1.31 | 14 |
| 16 | 1.92 | 8 |
| 17 | 12.82 | 16 |
| 18 | 9.59 | 17 |
| 19 | 6.49 | 18 |
| 20 | 3.28 | 19 |
| 21 | 3.90 | 20 |
| 22 | 1.07 | 21 |
| 23 | 1.60 | 22 |
| 24 | 19.43 | 16 |
| 25 | 16.34 | 24 |
| 26 | 8.68 | 25 |
| 27 | 3.98 | 26 |
| 28 | 3.11 | 27 |
| 29 | 1.67 | 28 |
| 30 | 0.81 | 29 |
| 31 | 0 | 0 |

For the above tables, in table 5, MCS 0 and MCS 8 are excluded from the slap down logic for single frequency configuration of the BTS. In table 6, MCS 0, MCS 8, and MCS 31 are excluded from the slap down logic for dual frequency configuration of the BTS. The method ensures that QoS (by way of throughput) is maximized for an end-user, while minimizing the use of satellite network and maximizing the use of long range land-to-sea wireless network including 4G and 5G but not limited to broadband, WiMAX, and Wi-Fi.

Figure 4:
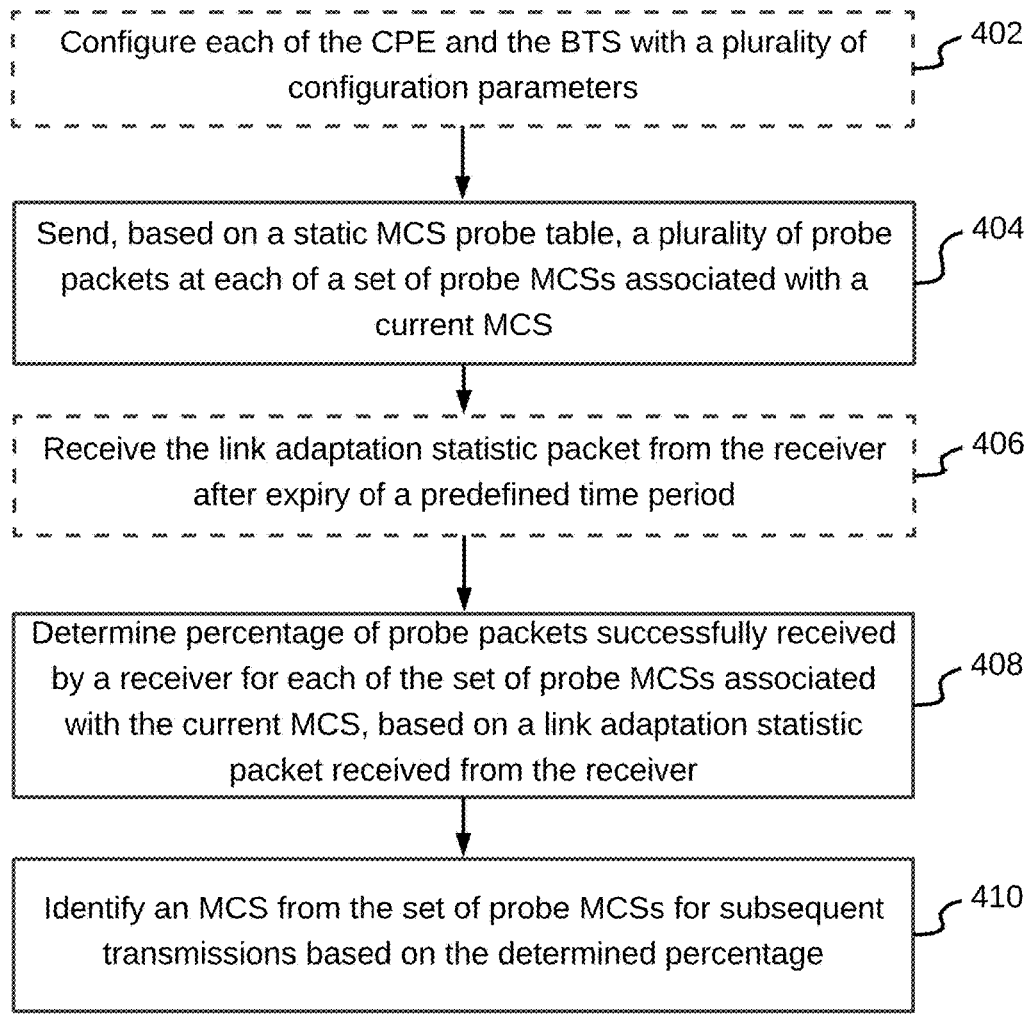
FIG. 4 illustrates a flowchart of a method of adapting transmission rate between a CPE and a BTS, in accordance with an embodiment.

Referring now to FIG. 4, a flowchart of a method of adapting transmission rate between a CPE and a BTS is illustrated, in accordance with an embodiment. At step 402, each of the CPE and the BTS may be configured with a plurality of configuration parameters. During power up the BTS and CPE may read the plurality of configuration parameters from flash and initialize the variable in main memory. The plurality of configuration parameters may include, but are not limited to length of a probe packet (la_probe_pkt_len), number of probe packets to be transmitted at one time (la_num_probes), percentage of airframes that include probe packets (la_probe_fraction), period at which a receiver collects probe statistics (la_probe_stats_intvl), and threshold above which probe statistics are considered valid (la_confidence_level). The BTS and CPE may reset the MCS to 0, when a new connection is established and initialize the probe packet with random data during power up. Once the connection is established, the state is changed from unconnected to connected. Thereafter, link adapt will start based on the state change.

Once the CPE and the BTS have been configured and the state is changed to connected, at step 404, a plurality of probe packets are sent at each of a set of probe MCSs associated with a current MCS, based on the static MCS probe table. By way of an example and referring back to the table 3, when the current MCS is 0, multiple probe packets are sent at following probe MCSs: 0, 1, 8, 2, and 3, as the current MCS of 0 is mapped to these probe MCSs in the table 3.

The plurality of probe packets may be Media Access Control (MAC) Protocol Data Units (PDUs) that are included in MAC data packets and are transmitted as a 'burst' of data. Multiple MAC PDUs can go out in a single burst, in a (type, length, value) TLV packet, such that, all MAC PDUs are concatenated into a single airframe. Probe packets may be sent as a single airframe packet and may be sent multiple times within a single airframe. There are no retransmissions on probes. In an embodiment, in order to determine the best possible MCS, a sender (for example the CPE) may sends out a series of probe packets to a receiver (for example, the BTS) based on the table 3 and 4, indexed by the current MCS, and statically determined. Additionally, to determine when to send probe packets, a random number generator module may be used. If the random number generator module returns a number less than the value of the configuration parameter: la_probe_fraction, then a probe packet may be transmitted. This may be evaluated within every 5 millisecond airframe. The length of the probe packet, i.e., la_probe_pkt_len, and the number of probe packets sent at a time, i.e., la_num_probes are configurable. The sender (for example, the CPE) keeps the next probe MCS to be transmitted indexed in a probe list. When it is time to send a probe packet, the sender sends the next one in the probe list. The sender will continue to cycle through the probe list, until the sender receives a link adaptation statistics packet (which will be a MAC PDU packet) from the receiver (for example, the BTS).

At step 406, the link adaptation statistic packet may be received by the sender from the receiver after expiry of a predefined time period (for example, la_probe_stats_intvl). In an embodiment, the receiver (for example, the BTS) may keep a record of the number of probe packets received from the sender (for example, the CPE) at a given MCS for the predefined time period, i.e., la_probe_stats_intvl. When the predefined time period expires, the receiver schedules the link adaptation statistic packet to be sent to the sender.

The link adaptation statistic packet may include information related to the number of probe packets that were successfully received by the receiver for each of the set of probe MCSs. By way of an example and referring back to table 3, when the current MCS is '0', multiple probe packets are transmitted at each of the following probe MCSs: 0, 1, 8, 2, and 3. The receiver keeps a record of the number of packets received at each of the probe MCSs, i.e., 0, 1, 8, 2, and 3.

Once the sender receives the link adaptation statistic packet, a percentage of probe packets successfully received by a receiver for each of the set of probe MCSs associated with the current MCS is determined at step 408, based on the information in the link adaptation statistic packet. By way of an example, for a dual frequency BTS configuration, the current MCS may be 20 and thus, based on the table 4, 10 probe packets are sent on each of the following probe MCSs: 14, 20, 28, 21, and 22. The number of probe packets successfully received at the receiver at each probe MCS may be as follows: 8 probe packets at MCS 14, 8 probe packets at MCS 20, 6 probe packets at MCS 28, 8 probe packets at MCS 21, and 4 probe packets at MCS 22. These statistics are stored in the link adaptation statistic packet. Using these statistics, the sender may determine the percentage of probe packets successfully received by the receiver as: 80% for MCS 14, 80% for MCS 20, 60% for MCS 28, 80% for MCS 21, and 40% for MCS 22.

Thereafter, based on the determined percentage for each probe MCS from the set of probe MCSs, an MCS is identified from the set of probe MCSs for subsequent transmissions at step 410. This is further explained in detail in conjunction with FIG. 5, FIG. 6, and FIG. 7. This method is thus a ramp-up model, such that, MCS with a better throughput is selected for subsequent transmissions.

In an embodiment, the ARQ retransmit percentage may be used to determine if the current MCS needs to be modified. This may be determined based on information in the tables 5 and 6. When the ARQ retransmit percentage reaches or exceeds an associated threshold, the sender ramps down to a lower MCS. This is further explained in detail in conjunction with FIG. 8.

Figure 5:
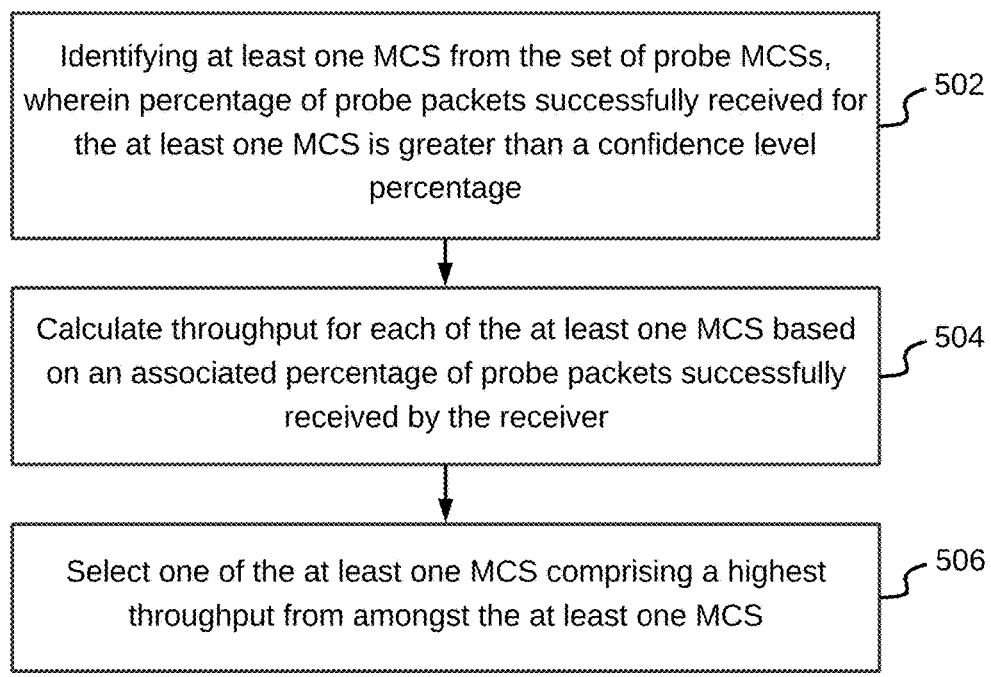
FIG. 5 illustrates a flowchart of a method for identifying a Modulation and Coding Scheme (MCS) for subsequent transmissions, in accordance with an embodiment.

Referring now to FIG. 5, a flowchart of a method for identifying a MCS for subsequent transmissions is illustrated, in accordance with an embodiment. Based on the static MCS probe table (for example, the tables 3 and 4), a plurality of probe packets are sent at each of a set of probe MCSs associated with a current MCS. At step 502, one or more MCSs are identified from the set of probe MCSs, such that, percentage of probe packets successfully received for the one or more MCS is greater than a confidence level percentage.

By way of an example, for a dual frequency BTS configuration, the current MCS may be 20 and thus, based on the table 4, 10 probe packets are sent on each of the following probe MCSs: 14, 20, 28, 21, and 22. The number of probe packets successfully received at the receiver at each probe MCS may be as follows: 8 probe packets at MCS 14, 8 probe packets at MCS 20, 6 probe packets at MCS 28, 8 probe packets at MCS 21, and 4 probe packets at MCS 22. These statistics are stored in the link adaptation statistic packet. Using these statistics, the sender may determine the percentage of probe packets successfully received by the receiver as: 80% for MCS 14, 80% for MCS 20, 60% for MCS 28, 80% for MCS 21, and 40% for MCS 22. In this example, the confidence level percentage may be fixed at 70%. Thus, MCS 14, MCS 20, and MCS 21 are identified out of the five probe MCSs.

At step 504, a throughput for each of the one or more MCS identified at step 502 is calculated based on an associated percentage of probe packets successfully received by the receiver. In continuation of the example above, a throughput is calculated for each of: MCS 14, MCS 20, and MCS 21. MCS 28 and MCS 22 are ignored as they did not satisfy the criterion of exceeding the confidence level percentage. This is further explained in detail in conjunction with FIG. 6. Thereafter, at step 506, one of the one or more MCSs that has a highest throughput from amongst the one or more MCSs is selected for subsequent transmissions.

Figure 6:
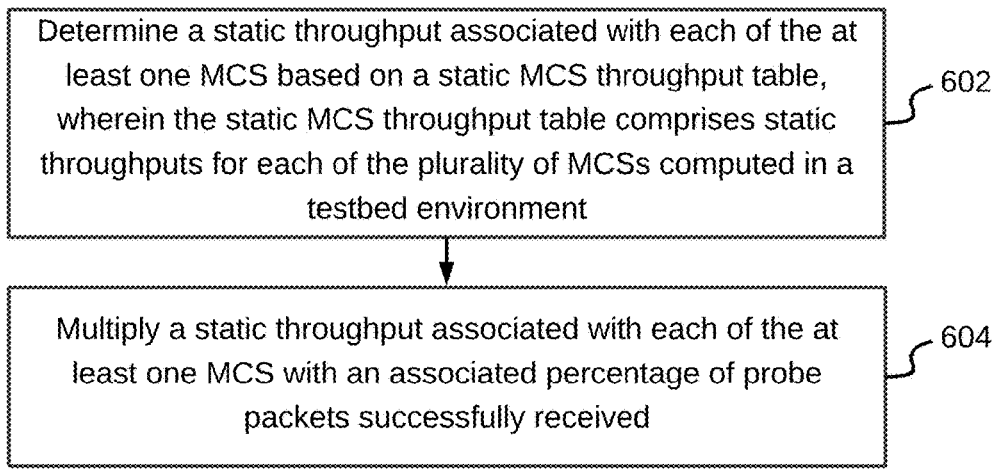
FIG. 6 illustrates a flowchart of a method of calculating throughput for one or more MCSs, in accordance with an embodiment.

Referring now to FIG. 6, a flowchart of a method of calculating throughput for one or more MCSs is illustrated, in accordance with an embodiment. Based on the static MCS throughput table, at step 602, a static throughput associated with each of one or more MCSs, which were identified at step 504, is determined. The static MCS throughput table includes static throughputs for each of the plurality of MCSs computed in a testbed environment. This has been explained in detail in conjunction with FIG. 3. In continuation of the example given in FIG. 5, static throughput is determined for each of MCS 14, MCS 20, and MCS 21 based on static throughput values given in table 2. Thus, MCS 14 has a static throughput of 59.1, MCS 20 has a static throughput of 61.5, and MCS 21 has a static throughput of 71.2.

At step 604, a static throughput associated with each of the one or more MCSs is multiplied with an associated percentage of probe packets successfully received. This results in calculation of throughout for each of the one or more MCSs. In continuation of the example above, static throughput for each of MCS 14, MCS 20, and MCS 21 is multiplied with the associated percentage, which is same for each of these MCSs, i.e., 80%. Thus, the throughput for MCS 14 is calculated as: 59.1*0.8=47.28, for MCS 20 as: 61.5*0.8=49.2, and for MCS 21 as 71.2*0.8=56.96. Since, MCS 21 has the highest throughput, i.e., 56.96, MCS 21 is selected as the best MCS for subsequent transmissions.

Figure 7:
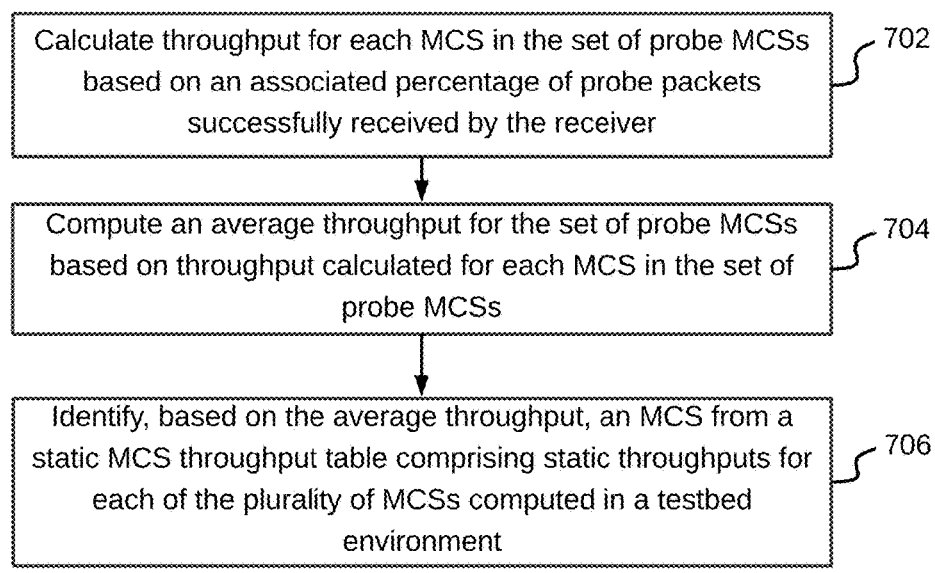
FIG. 7 illustrates a flowchart of a method for identifying a MCS for subsequent transmissions, in accordance with another embodiment.

Referring now to FIG. 7, a flowchart of a method for identifying a MCS for subsequent transmissions is illustrated, in accordance with another embodiment. Based on the static MCS probe table (for example, the tables 3 and 4), a plurality of probe packets are sent at each of a set of probe MCSs associated with a current MCS. At step 702, a throughput for each MCS in the set of probe MCSs is calculated based on an associated percentage of probe packets successfully received by the receiver. This has been explained in detail in conjunction with FIG. 5. In continuation of the example given in FIG. 6, a throughput for MCS 14 is calculated as 47.28, for MCS 20 as 49.2, for MCS 21 as 56.96. Additionally, a throughput for MCS 28 is calculated as: 71.0*0.6=42.6 and a throughput for MCS 22 is calculated as: 74.2*0.4=29.68.

At step 704, an average throughput is computed for the set of probe MCSs based on throughput calculated for each MCS in the set of probe MCSs. In continuation of the example above, the average throughput is calculated as: (47.28+49.2+42.6+56.96+29.68)/5=45.14. At step 706, based on the average throughput, an MCS from a static MCS throughput table is identified. In an embodiment, the average throughput is mapped to the closest throughput in the static MCS throughput table, such that, the average throughput is less than or equal to the mapped value. The MCS corresponding to this mapped throughput is then picked as the MCS for subsequent transmissions. In continuation of the example above, the average throughput of 45.14 is compared with static throughputs given in table 2. Based on the comparison, the throughput of 44.8 is identified as being closest to the average throughput of 45.14. Thus, MCS 19 is identified as the MCS for subsequent transmissions. It will be apparent to a person skilled in the art that unlike the embodiment discussed in FIG. 5 and FIG. 6, the embodiment discussed in FIG. 7 does not take into consideration the confidence level percentage.

Figure 8:
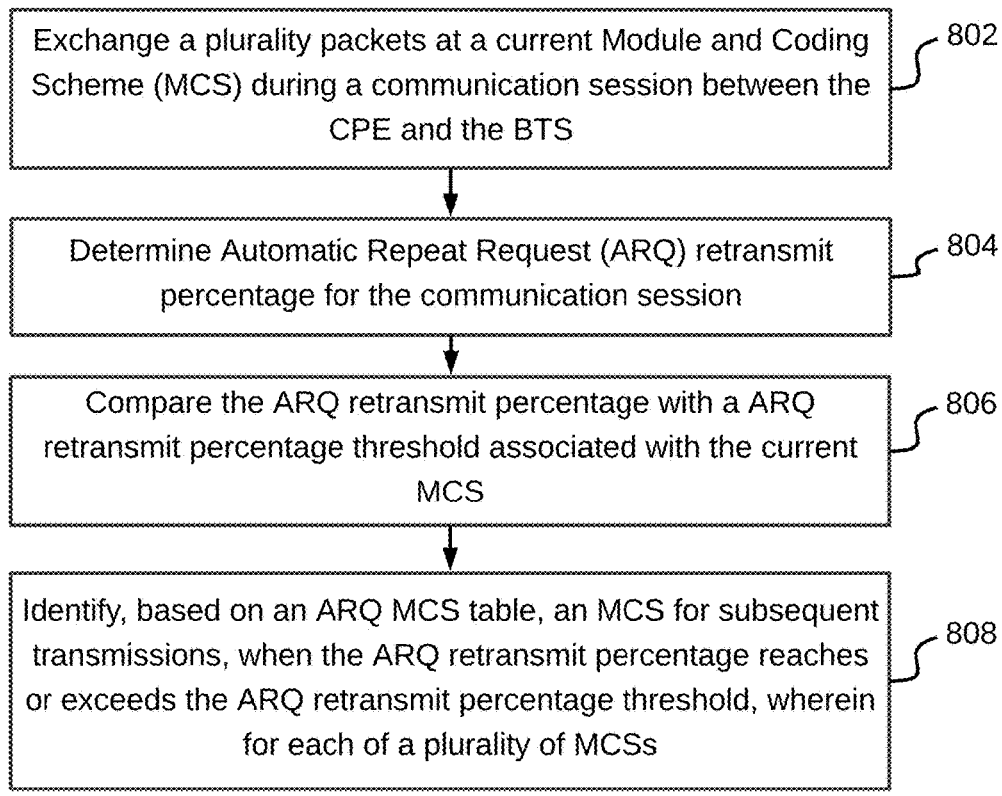
FIG. 8 illustrates a flowchart of a method of adapting transmission rate between a CPE and a BTS, in accordance with another embodiment.

Referring now to FIG. 8, a flowchart of a method of adapting transmission rate between a CPE and a BTS is illustrated, in accordance with another embodiment. At step 802, a plurality of packets are exchanged at a current MCS during an ongoing communication session between the CPE and the BTS. At step 804, an ARQ retransmit percentage is determined for the communication session. The ARQ retransmit percentage may be determined based on an analysis of the link adaptation statistic packet. At step 806, the ARQ retransmit percentage is compared with an ARQ retransmit percentage threshold associated with the current MCS. ARQ retransmit percentage thresholds associated with various MCSs may be stored in an ARQ MCS table, for example, the tables 5 and 6 given in FIG. 3. For each of a plurality of MCSs, the ARQ MCS table includes an associated ARQ retransmit percentage threshold and an associated subsequent MCS. By way of an example and referring back to table 5, for MCS 7, an ARQ retransmit percentage threshold is 4.33 and a subsequent MCS or slap-down MCS is MCS 6. By way of another example and referring back to table 6, for MCS 16, an ARQ retransmit percentage threshold is 1.92 and a subsequent MCS or slap-down MCS is MCS 8.

When the ARQ retransmit percentage reaches or exceeds the ARQ retransmit percentage threshold for the current MCS, an MCS for subsequent transmissions is identified at step 808, based on the ARQ MCS table. In continuation of the example above, for single frequency configuration of the BTS, the current MCS may be MCS 7. Referring back to table 5, the ARQ retransmit percentage for the ongoing communication session at MCS 7 may reach or exceed the ARQ retransmit percentage threshold of 4.33 (mapped to the MCS 7 in the table 5). When the ARQ retransmit percentage threshold of 4.33 is reached or exceeded, MCS is immediately slapped down to MCS 6, based on the table 5. In other words, MCS 6 is used for subsequent transmissions. By way of another example, for dual frequency configuration of the BTS, the current MCS may be MCS 16. Referring back to table 6, the ARQ retransmit percentage for the ongoing communication session at MCS 16 may reach or exceed the ARQ retransmit percentage threshold of 1.92 (mapped to the MCS 16 in the table 6). When the ARQ retransmit percentage threshold of 1.92 is reached or exceeded, MCS is immediately slapped down to MCS 8, based on the table 6. In other words, MCS 8 is used for subsequent transmissions.

Figure 9:
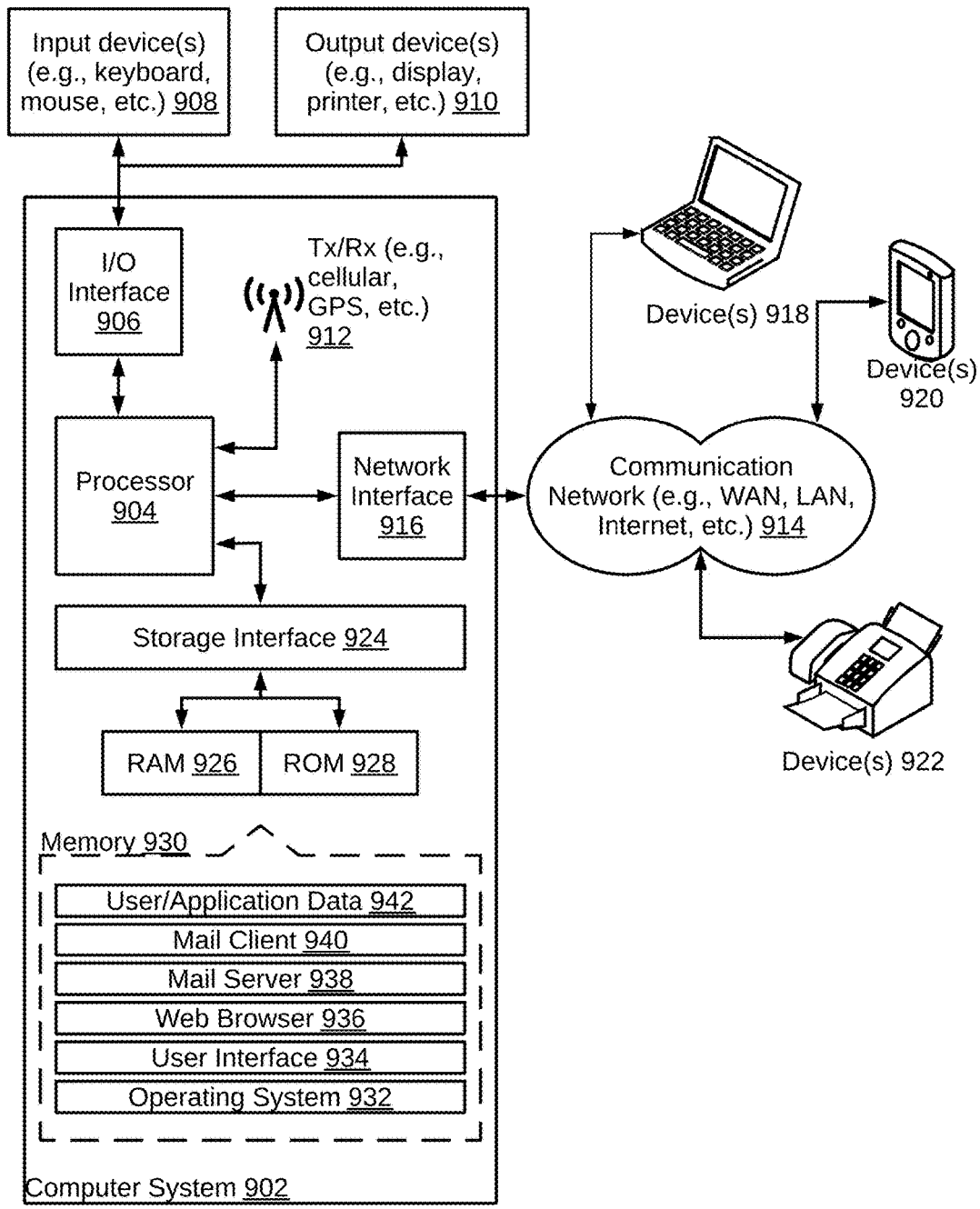
FIG. 9 illustrates a block diagram of an exemplary computer system for implementing various embodiments.

FIG. 9 is a block diagram of an exemplary computer system for implementing various embodiments. Computer system 902 may include a central processing unit ("CPU" or "processor") 904. Processor 904 may include at least one data processor for executing program components for executing user- or system-generated requests. A user may include a person, a person using a device such as such as those included in this disclosure, or such a device itself. Processor 904 may include specialized processing units such as integrated system (bus) controllers, memory management control units, floating point units, graphics processing units, digital signal processing units, etc. Processor 904 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 904 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 904 may be disposed in communication with one or more input/output (I/O) devices via an I/O interface 906. I/O interface 906 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 906, computer system 902 may communicate with one or more I/O devices. For example, an input device 908 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 910 may be a printer, fax machine, video display (e.g., cathode ray tube (CRT), liquid crystal display (LCD), light-emitting diode (LED), plasma, or the like), audio speaker, etc. In some embodiments, a transceiver 912 may be disposed in connection with processor 904. Transceiver 912 may facilitate various types of wireless transmission or reception. For example, transceiver 912 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11 a/b/g/n, Bluetooth, FM, global positioning system (GPS), 2G/3G HSDPA/HSUPA communications, etc.

In some embodiments, processor 904 may be disposed in communication with a communication network 914 via a network interface 916. Network interface 916 may communicate with communication network 914. Network interface 916 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 914 may include, without limitation, a direct interconnection, local area network (LAN), wide area network (WAN), wireless network (e.g., using Wireless Application Protocol), the Internet, etc. Using network interface 916 and communication network 914, computer system 902 may communicate with devices 918, 920, and 922. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 902 may itself embody one or more of these devices.

In some embodiments, processor 904 may be disposed in communication with one or more memory devices (e.g., RAM 926, ROM 928, etc.) via a storage interface 924. Storage interface 924 may connect to memory 930 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 930 may store a collection of program or database components, including, without limitation, an operating system 932, user interface application 934, web browser 936, mail server 938, mail client 940, user/application data 942 (e.g., any data variables or data records discussed in this disclosure), etc. Operating system 932 may facilitate resource management and operation of computer system 902. Examples of operating systems 932 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 934 may facilitate display, execution, interaction, manipulation, or operation of program components through textual or graphical facilities. For example, user interfaces may provide computer interaction interface elements on a display system operatively connected to computer system 902, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 902 may implement a web browser 936 stored program component. Web browser 936 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 902 may implement a mail server 938 stored program component. Mail server 938 may be an Internet mail server such as MICROSOFT® EXCHANGE® mail server, or the like. Mail server 938 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 938 may utilize communication protocols such as internet message access protocol (IMAP), messaging application programming interface (MAPI), Microsoft Exchange, post office protocol (POP), simple mail transfer protocol (SMTP), or the like. In some embodiments, computer system 902 may implement a mail client 940 stored program component. Mail client 940 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 902 may store user/application data 942, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method, device, and system for calibrating and adapting transmission rate in wireless communication. The provided method uses static table driven MCS ramp-up (which is slow) and MCS slap-down (which is aggressive) link adaptation procedure, which pushes throughput to the theoretical limits. This can be applied to any similar link adaptation requirement, for example, but not limited to 3G, 3.5G, 4G, WiMAX, and Wi-Fi. Moreover, the provided methods is a statistical approach that is simpler to implement and execute. The method further ensures that QoS (throughput) is maximized for the end-user, while minimizing the use of satellite network and maximizing the use of LRLS network including 4G, 5G but not limited to broadband, WiMAX, Wi-Fi.

The specification has described provide method, device, and system for calibrating and adapting transmission rate in wireless communication. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of adapting transmission rate between a Customer Premises Equipment (CPE) and a Base Transceiver Station (BTS), the method comprising:
   sending, based on a static Module and Coding Schemes (MCS) probe table, a plurality of probe packets at each of a set of probe MCSs associated with a current MCS, wherein the static MCS probe table comprises a plurality of MCSs and a set of probe MCSs associated with each of the plurality of MCSs;
   determining percentage of probe packets successfully received by a receiver for each of the set of probe MCSs associated with the current MCS, based on a link adaptation statistic packet received from the receiver, wherein the link adaptation statistic packet is received from the receiver after expiry of a predefined time period, and wherein the link adaptation statistic packet comprises information related to the number of probe packets successfully received by the receiver for each of the set of probe MCSs; and
   identifying an MCS from the set of probe MCSs for subsequent transmissions based on the determined percentage.

2. The method of claim 1, wherein identifying the MCS for subsequent transmissions comprises:
   identifying at least one MCS from the set of probe MCSs, wherein percentage of probe packets successfully received for the at least one MCS is greater than a confidence level percentage;
   calculating throughput for each of the at least one MCS based on an associated percentage of probe packets successfully received by the receiver; and
   selecting one of the at least one MCS comprising a highest throughput from amongst the at least one MCS.

3. The method of claim 2, wherein calculating throughput for each of the at least one MCS comprising:
   determining a static throughput associated with each of the at least one MCS based on a static MCS throughput table, wherein the static MCS throughput table comprises static throughputs for each of the plurality of MCSs computed in a testbed environment; and
   multiplying a static throughput associated with each of the at least one MCS with an associated percentage of probe packets successfully received.

4. The method of claim 1, wherein identifying the MCS for subsequent transmissions comprises:
   calculating throughput for each MCS in the set of probe MCSs based on an associated percentage of probe packets successfully received by the receiver;

computing an average throughput for the set of probe MCSs based on throughput calculated for each of the set of probe MCSs; and identifying, based on the average throughput, an MCS from a static MCS throughput table comprising static throughputs for each of the plurality of MCSs computed in a testbed environment.

5. The method of claim 1 further comprising configuring each of the CPE and the BTS with a plurality of configuration parameters.

6. A method of adapting transmission rate between a Customer Premises Equipment (CPE) and a Base Transceiver Station (BTS), the method comprising:

exchanging a plurality packets at a current Module and Coding Scheme (MCS) during a communication session between the CPE and the BTS;

determining Automatic Repeat Request (ARQ) retransmit percentage for the communication session;

comparing the ARQ retransmit percentage with a ARQ retransmit percentage threshold associated with the current MCS; and identifying, based on an ARQ MCS table, an MCS for subsequent transmissions, when the ARQ retransmit percentage reaches or exceeds the ARQ retransmit percentage threshold, wherein for each of a plurality of MCSs, the ARQ MCS table comprises an associated ARQ retransmit percentage threshold and an associated subsequent MCS.

7. A method of calibrating transmission rate between a Customer Premises Equipment (CPE) and a Base Transceiver Station (BTS), the method comprising:

initiating a communication session between the CPE and the BTS through a client computing device communicatively coupled to the CPE and a server computing device communicatively coupled to the BTS, wherein the communication session is routed through an attenuator;

determining a throughput, during the communication session, associated with each of a plurality of Module and Coding Schemes (MCSs);

computing average Automatic Repeat Request (ARQ) retransmit percentage for each of the plurality of MCSs for an associated average throughput;

creating a static MCS probe table comprising each of the plurality of MCSs, a set of probe MCSs associated with each of the plurality of MCSs, and throughput associated with each probe MCS in each set of probe MCSs, wherein a current MCS is modified to an MCS selected from an associated set of probe MCSs based on the static MCS probe table; and creating an ARQ MCS table based on the plurality of MCSs and an associated average ARQ retransmit percentage, wherein for each of the plurality of MCSs the ARQ MCS table comprises an associated ARQ retransmit percentage threshold and an associated future MCS, and wherein a current MCS is changed to the associated future MCS when ARQ retransmit percentage threshold linked with the current MCS is reached or exceeded.

8. The method of claim 7, wherein the set of probe MCSs is selected from the plurality of MCSs based on predefined selection criteria.

9. A transceiver for adapting transmission rate between a Customer Premises Equipment (CPE) and a Base Transceiver Station (BTS), the transceiver comprising:

an antenna array;

a processor communicatively coupled to the antenna array; and a memory communicatively coupled to the processor, wherein the memory stores processor instructions, which on execution causes the processor to:

send, based on a static Module and Coding Schemes (MCS) probe table, a plurality of probe packets at each of a set of probe MCSs associated with a current MCS, wherein the static MCS probe table comprises a plurality of MCSs and a set of probe MCSs associated with each of the plurality of MCSs;

determine percentage of probe packets successfully received by a receiver for each of the set of probe MCSs associated with the current MCS, based on a link adaptation statistic packet received from the receiver, wherein the link adaptation statistic packet is received from the receiver after expiry of a predefined time period, and wherein the link adaptation statistic packet comprises information related to the number of probe packets successfully received by the receiver for each of the set of probe MCSs; and identify an MCS from the set of probe MCSs for subsequent transmissions based on the determined percentage.

10. The transceiver of claim 9, wherein to identifying the MCS for subsequent transmissions, the processor instructions further cause the processor to:

identify at least one MCS from the set of probe MCSs, wherein percentage of probe packets successfully received for the at least one MCS is greater than a confidence level percentage;

calculate throughput for each of the at least one MCS based on an associated percentage of probe packets successfully received by the receiver; and select one of the at least one MCS comprising a highest throughput from amongst the at least one MCS.

11. The transceiver of claim 10, wherein to calculate throughput for each of the at least one MCS, the processor instructions further cause the processor to:

determine a static throughput associated with each of the at least one MCS based on a static MCS throughput table, wherein the static MCS throughput table comprises static throughputs for each of the plurality of MCSs computed in a testbed environment; and multiply a static throughput associated with each of the at least one MCS with an associated percentage of probe packets successfully received.

12. The transceiver of claim 9, wherein to identifying the MCS for subsequent transmissions, the processor instructions further cause the processor to:

calculate throughput for each MCS in the set of probe MCSs based on an associated percentage of probe packets successfully received by the receiver;

compute an average throughput for the set of probe MCSs based on throughput calculated for each of the set of probe MCSs; and identify, based on the average throughput, an MCS from a static MCS throughput table comprising static throughputs for each of the plurality of MCSs computed in a testbed environment.

13. The transceiver of claim 9, wherein the processor instructions further cause the processor to configure each of the CPE and the BTS with a plurality of configuration parameters.

14. The transceiver of claim 9, wherein one of the CPE and the BTS comprises the transceiver.

15. A transceiver for adapting transmission rate between a Customer Premises Equipment (CPE) and a Base Transceiver Station (BTS), the transceiver comprising:

an antenna array;

a processor communicatively coupled to the antenna array; and a memory communicatively coupled to the processor, wherein the memory stores processor instructions, which on execution causes the processor to:
  exchange a plurality packets at a current Module and Coding Scheme (MCS) during a communication session between the CPE and the BTS;
  determine Automatic Repeat Request (ARQ) retransmit percentage for the communication session;
  compare the ARQ retransmit percentage with a ARQ retransmit percentage threshold associated with the current MCS; and
  identify, based on an ARQ MCS table, an MCS for subsequent transmissions, when the ARQ retransmit percentage reaches or exceeds the ARQ retransmit percentage threshold, wherein for each of a plurality of MCSs, the ARQ MCS table comprises an associated ARQ retransmit percentage threshold and an associated subsequent MCS.

16. The transceiver of claim 15, wherein one of the CPE and the BTS comprises the transceiver.

17. A system for calibrating transmission rate between a Customer Premises Equipment (CPE) and a Base Transceiver Station (BTS), the system comprising:
  a processor; and
  a memory communicatively coupled to the processor, wherein the memory stores processor instructions, which on execution causes the processor to:
    initiate a communication session between the CPE and the BTS through a client computing device communicatively coupled to the CPE and a server computing device communicatively coupled to the BTS, wherein the communication session is routed through an attenuator;
    determine a throughput, during the communication session, associated with each of a plurality of Module and Coding Schemes (MCSs);
    compute average Automatic Repeat Request (ARQ) retransmit percentage for each of the plurality of MCSs for an associated average throughput;
    create a static MCS probe table comprising each of the plurality of MCSs, a set of probe MCSs associated with each of the plurality of MCSs, and throughput associated with each probe MCS in each set of probe MCSs, wherein a current MCS is modified to an MCS selected from an associated set of probe MCSs based on the static MCS probe table; and
    create an ARQ MCS table based on the plurality of MCSs and an associated average ARQ retransmit percentage, wherein for each of the plurality of MCSs the ARQ MCS table comprises an associated ARQ retransmit percentage threshold and an associated future MCS, and wherein a current MCS is changed to the associated future MCS when ARQ retransmit percentage threshold linked with the current MCS is reached or exceeded.

18. The system of claim 17, wherein the set of probe MCSs is selected from the plurality of MCSs based on predefined selection criteria.

* * * * *